(12) United States Patent
Boss et al.

(10) Patent No.: US 7,894,794 B2
(45) Date of Patent: Feb. 22, 2011

(54) METHOD AND SYSTEM FOR TRIGGERING A LOCAL EMERGENCY SYSTEM USING WIRELESS MEANS

(75) Inventors: Gregory Jensen Boss, American Fork, UT (US); Rick Allen Hamilton, II, Charlottesville, VA (US); Andrew R. Jones, Round Rock, TX (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 11/697,795

(22) Filed: Apr. 9, 2007

(65) Prior Publication Data
US 2008/0248778 A1    Oct. 9, 2008

(51) Int. Cl.
*H04M 11/04*    (2006.01)

(52) U.S. Cl. .............. 455/404.1; 455/404.2; 455/456.1; 455/11.1; 455/13.1; 455/41.2; 370/310.2; 370/328; 370/338

(58) Field of Classification Search .............. 455/404.1, 455/404.2, 414.1, 414.2, 440, 456.1–456.6, 455/457, 11.1, 13.1, 41.2; 370/328, 338, 370/310.1, 310.2; 340/287–309; 379/37–51
See application file for complete search history.

(56) References Cited

U.S. PATENT DOCUMENTS

| | | | |
|---|---|---|---|
| 5,016,269 A | 5/1991 | Rogers | |
| 6,014,555 A * | 1/2000 | Tendler | 455/404.1 |
| 6,532,368 B1 | 3/2003 | Hild et al. | |
| 6,646,549 B2 | 11/2003 | Dawson | |
| 6,889,137 B1 | 5/2005 | Rychlak | |
| 7,042,338 B1 | 5/2006 | Weber | |
| 7,042,350 B2 | 5/2006 | Patrick et al. | |
| 2002/0085703 A1 | 7/2002 | Proctor | |
| 2002/0145514 A1 | 10/2002 | Dawson | |
| 2003/0050040 A1 | 3/2003 | Yamazaki et al. | |
| 2004/0029592 A1 * | 2/2004 | Shyy et al. | 455/453 |
| 2004/0203563 A1 * | 10/2004 | Menard | 455/404.1 |
| 2004/0239498 A1 | 12/2004 | Miller | |
| 2005/0085257 A1 | 4/2005 | Laird et al. | |
| 2005/0101334 A1 * | 5/2005 | Brown et al. | 455/456.3 |
| 2006/0007038 A1 | 1/2006 | Boling et al. | |
| 2006/0276168 A1 * | 12/2006 | Fuller et al. | 455/404.2 |

FOREIGN PATENT DOCUMENTS

EP    1293947 B1    12/2004

* cited by examiner

*Primary Examiner*—Kent Chang
*Assistant Examiner*—San Htun
(74) *Attorney, Agent, or Firm*—Schmeiser, Olsen & Watts; William E. Schiesser

(57) ABSTRACT

A method and system for triggering a local emergency system using wireless means. Existing local emergency systems are exploited through an ordinary mobile user device implementing the present invention. Disadvantages of current local emergency system are overcome by facilitating a user to remotely report emergency service request with more accurate location information automatically conveyed by the present invention. A mobile user device is configured to activate an emergency service station of a local emergency system without knowing the location of the emergency service station and without physically accessing and operating the emergency service station.

17 Claims, 7 Drawing Sheets

METHOD AND SYSTEM FOR TRIGGERING A LOCAL EMERGENCY SYSTEM USING WIRELESS MEANS

FIELD OF THE INVENTION

The present invention discloses a method and system for triggering a local emergency system using wireless means.

BACKGROUND OF THE INVENTION

Conventional devices for reporting an emergency to an emergency service provider are numerous. These reporting devices have limitations, however, depending upon the type of such reporting devices. For dedicated reporting devices which are fixed in a specific location for the purpose of an emergency report, a user who attempts to report must know where the reporting device is located, and then, must physically access and operate the reporting device. Examples of a dedicated reporting device may be, inter alia, a fire alarm box, a police/highway call box, a campus emergency poll, etc. For regular cellular and landline telephones, a reporter must communicate the location information for an emergency service provider to respond, which is often impaired by physical inability of the reporter or by the nature of the emergency being reported. Even though such communication problems may not exist in a telephone system supporting Enhanced 911 system (E911) which may automatically deliver the location information, E911 systems are expensive and limited in availability.

Thus, there is a need for a method and system that overcomes at least one of the preceding disadvantages of current emergency reporting methods and systems.

SUMMARY OF THE INVENTION

The present invention provides a method for triggering a local emergency system using wireless means, wherein the local emergency system comprises an emergency service provider and at least one emergency service station, wherein said at least one emergency service station communicates with the emergency service provider via an emergency system network which employs an emergency system protocol, wherein a mobile user device communicates with said at least one emergency service station via a wireless ad-hoc connection which employs a wireless communication protocol, said method comprising:

establishing the wireless ad-hoc connection between the mobile user device and said at least one emergency service station;

detecting an emergency service request from a user input on the mobile user device;

broadcasting the detected emergency service request; and receiving an acknowledgement from said at least one emergency service station which had received the broadcasted emergency service request from the mobile user device and is servicing the received emergency service request, wherein said at least one emergency service station is configured to relay communication between the mobile user device and the emergency service provider pursuant to the wireless communication protocol and pursuant to the emergency system protocol, wherein said establishing, said detecting, said broadcasting, and said receiving the acknowledgement are performed by the mobile user device.

The present invention provides a method for triggering a local emergency system using wireless means, wherein the local emergency system comprises an emergency service provider and at least one emergency service station, wherein said at least one emergency service station communicates with the emergency service provider via an emergency system network which employs an emergency system protocol, wherein a mobile user device communicates with said at least one emergency service station via a wireless ad-hoc connection which employs a wireless communication protocol, said method comprising:

establishing the wireless ad-hoc connection between the mobile user device and a first emergency service station of said at least one emergency service station;

receiving an emergency service request broadcasted by the mobile user device; and reporting the received emergency service request to the emergency service provider with all information necessary to report the received emergency service request to the emergency service provider, wherein the first emergency service station is configured to relay communication between the mobile user device and the emergency service provider pursuant to the wireless communication protocol and pursuant to the emergency system protocol, wherein said establishing, said receiving, and said reporting are performed by the first emergency service station.

The present invention provides a method for triggering a local emergency system using wireless means, wherein the local emergency system comprises an emergency service provider and at least one emergency service station, wherein said at least one emergency service station communicates with the emergency service provider via an emergency system network which employs an emergency system protocol, wherein a mobile user device communicates with said at least one emergency service station via a wireless ad-hoc connection which employs a wireless communication protocol, said method comprising:

receiving an emergency service request reported by a first emergency service station of said at least one emergency service station which had received the emergency service request broadcasted from the mobile user device; and responding to the received emergency service request with at least one emergency service which is provided by the emergency service provider, wherein said at least one emergency service station is configured to relay communication between the mobile user device and the emergency service provider pursuant to the wireless communication protocol and pursuant to the emergency system protocol, wherein said receiving and said responding are performed by the emergency service provider.

The present invention provides a method and system that overcomes at least one of the current disadvantages of conventional method and system for reporting an emergency.

DETAILED DESCRIPTION OF THE INVENTION

The method and system of the present invention solves problems of a conventional emergency system. The present invention allows an individual to remotely activate a local emergency system with a mobile user device connected to the local emergency system without knowing the location of an emergency service station or physically accessing and operating the emergency service station. The local emergency system utilized in the present invention is "local" in the sense that the emergency system is established in a certain geographic location and non-mobile, regardless of the area coverage of the emergency system. This feature is particularly beneficial for users who are not physically capable of breaking a glass cover and pressing an alarm button or pulling a heavy lever to activate a local emergency system. The present invention facilitates a faster response to an emergency with more accurate information which is automatically conveyed to an emergency service provider.

The present invention provides flexible and better services by using existing local emergency system infrastructures and overcomes the drawbacks of conventional solutions which use dedicated devices for both users and reporting stations. With a conventional solution using a dedicated device, a user device can report only an emergency service request designed for the device, thus the capability to report an emergency service request is limited and the user device cannot be utilized in existing emergency systems.

In the present invention, an emergency service station which had received an emergency service request returns an acknowledgement to a mobile user device that had sent out the emergency service request. This acknowledgement notifies a user that the emergency service request has been successfully reported to an emergency service provider. Also, because the present invention uses an existing emergency service station to report an emergency service request, the exact location of the reporting emergency service station can easily be reported or already known to the emergency service provider. Thus, the emergency service provider can respond to an emergency service request without depending on the information provided by a user or engaging informational system such as Enhanced 911 (E911). The present invention may either gather information from a user reporting an emergency or automatically generate additional information. Thus, the emergency service provider may respond with more accurate information than conventional emergency reporting system under the circumstances.

Figure 1:
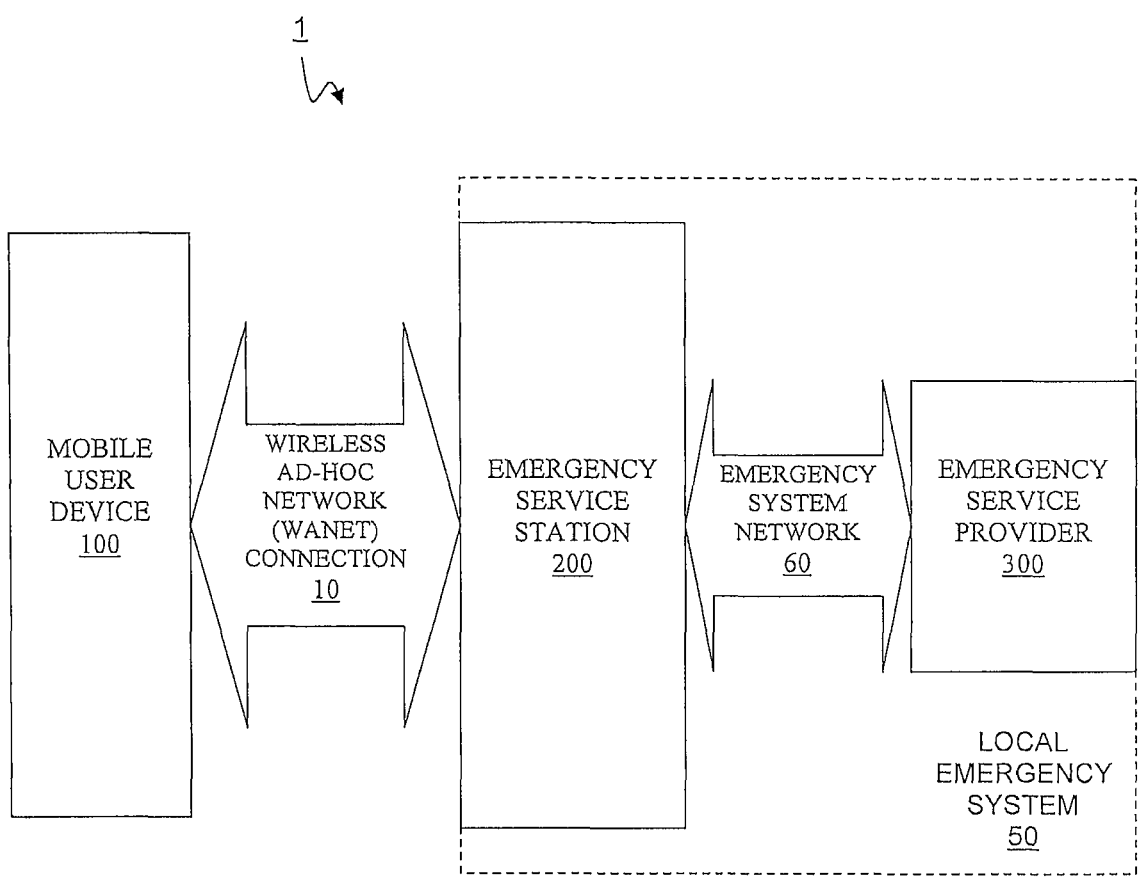
FIG. 1 illustrates a computer system, comprising a mobile user device, a local emergency system which comprises an emergency service station, an emergency service provider, and an emergency system network. The emergency service station is coupled to the mobile user device via a wireless ad-hoc network (WANET) connection and the emergency service provider is coupled to the emergency service station via the emergency system network, in accordance with embodiments of the present invention.

FIG. 1 illustrates a computer system 1, comprising a mobile user device 100, a local emergency system 50 which comprises an emergency service station 200, an emergency service provider 300, and an emergency system network 60. The emergency service station 200 is coupled to the mobile user device 100 via a wireless ad-hoc network (WANET) connection 10 and the emergency service provider 300 is coupled to the emergency service station 200 via the emergency system network 60, in accordance with embodiments of the present invention.

The present invention utilizes any wireless networking technology available to connect a local emergency system to a nearby mobile user device through a wireless ad-hoc network (WANET) connection. Examples of currently available wireless networking technology may be, inter alia, Radio Frequency Identification (RFID), cellular network, 802.11x, infrared, Bluetooth, ZigBee, etc. The WANET connection accommodates a bidirectional communication to support additional information collection about the emergency and a user or a mobile user device which had initiated the emergency service request. The mobile user device which had broadcasted the emergency service request may receive an acknowledgement which indicates that the emergency service request is successfully reported to the emergency service provider.

Examples of a mobile user device may be, inter alia, a cellular telephone, a Personal Digital Assistant (PDA), etc. The mobile user device is configured to broadcast a signal on a local emergency system when the mobile user device detects a user input requesting an emergency service.

A local emergency system is a conventional emergency system which comprises multiple emergency service stations reporting an emergency service request and an emergency service provider responding to the emergency service request. Examples of a local emergency system may be, inter alia, a panic button and accompanying alarm system, a fire alarm and/or sprinkler system, a roadside call box system for transit emergency or the police, a nuclear safety system, a campus security system, a building maintenance and/or security system, a hospital emergency alert system, etc. Within a local emergency system, emergency service stations and an emergency service provider communicates through an emergency system network. The emergency system network may be implemented as a wired or a wireless network. Examples of an emergency system network may be, inter alia, RFID, cellular network, 802.11x, infrared, Bluetooth, Zigbee, Ethernet, Public Switched Telephone Network (PSTN), dedicated circuit, etc.

An emergency service station will activate a normal response defined in a local emergency system for an emergency service request upon receipt of such request. Examples of a normal response in a local emergency system may be, inter alia, sounding of an audio alarm, displaying of a visual alarm, notifying a building or public emergency and/or safety departments, activating sprinkler systems, etc. If an emergency service station is equipped with bidirectional communication capability, the emergency service station could respond to the mobile user device which had sent the emergency service request that the request has been received and the local emergency system is acting upon the request. By installing a simple transmitter and/or receiver, existing emergency systems and mobile user devices could be retrofitted with bidirectional communication capability. In case of designing a new device, the bidirectional communication capability can be included as standard.

An emergency service station with bidirectional communication capability is configured to relay communication between a mobile user device and an emergency service provider. The emergency service station communicates with the mobile user device via a WANET connection and communicates with the emergency service provider via an emergency system network. When an emergency service station receives an emergency service request transmitted by a mobile user device, the emergency service station transmits the emergency service request to the emergency service provider and acknowledges the emergency service request to the mobile user device. When an emergency service station receives a request for more information on a reporting mobile user device from an emergency service provider, the emergency service station transmits the request for more information to the mobile user device and collects responses from the mobile user device on the request for more information and transfers the responses to the emergency service provider.

Figure 2:
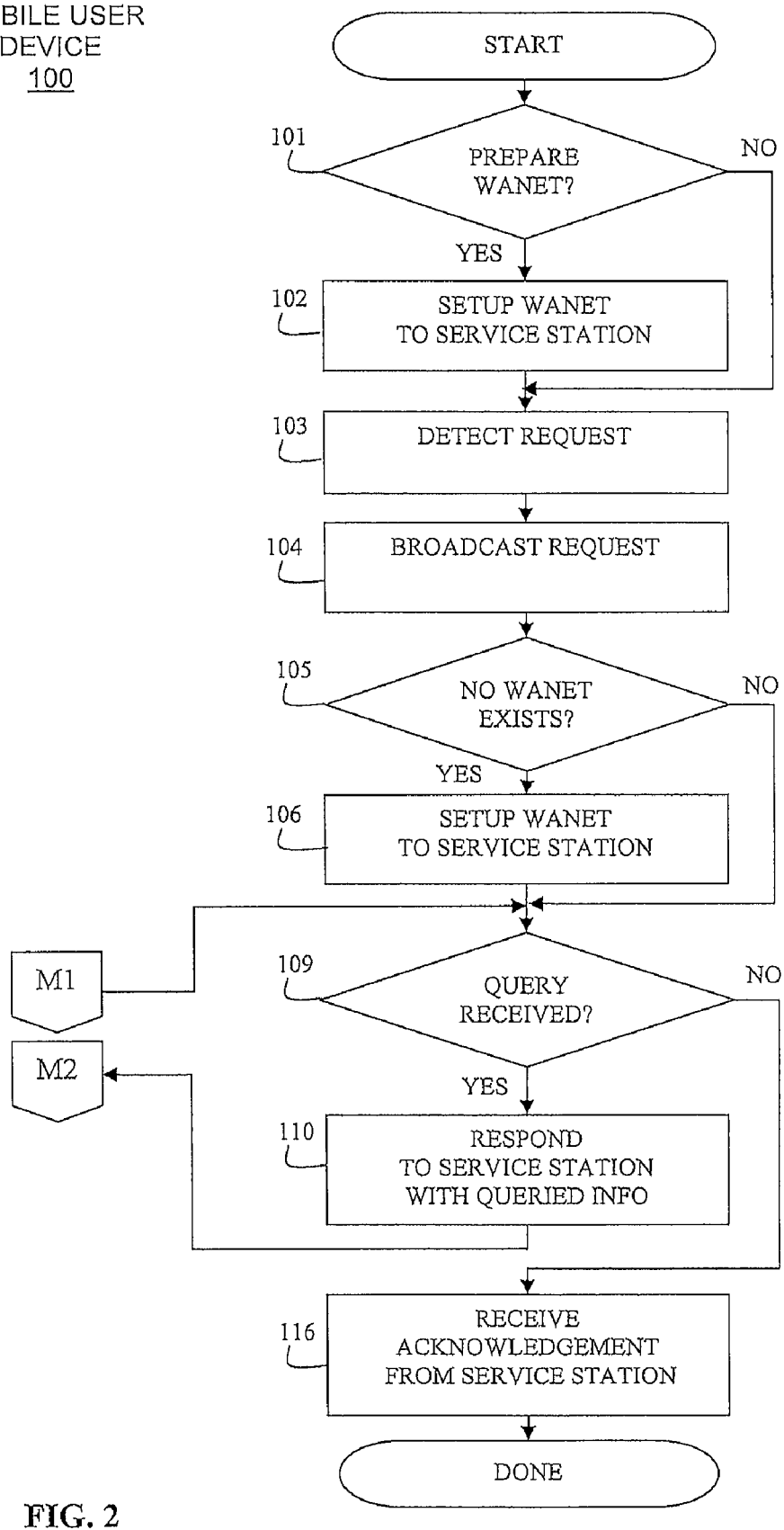
FIG. 2 is a flow chart depicting a method for triggering a local emergency system using wireless means performed by a mobile user device of FIG. 1, in accordance with embodiments of the present invention.

FIG. 2 is a flow chart depicting a method for triggering a local emergency system using wireless means performed by a mobile user device of FIG. 1, in accordance with embodiments of the present invention.

In the present invention, a mobile user device communicates with a local emergency system via a wireless ad-hoc network (WANET) connection. To achieve a WANET connection, an access point for the mobile user device into the local emergency system is necessary. Such an access point into a different network is called a wireless access point (WAP or AP), and an emergency service station within the local emergency system performs the WAP function in the present invention. There are multiple options on how and when to establish a WANET connection between a mobile user device and emergency service stations (WAPs).

Because a WANET connection may be established whenever early enough to service an emergency service request, a mobile user device can establish the WANET connection at a time chosen by a vendor of the present invention. In step 101, a mobile user device performing the method of present invention determines whether a WANET connection must be prepared before detecting an emergency service request pursuant to the characteristics of the wireless network and the wireless communication protocol employed for the WANET connection. If the mobile user device determines that a WANET connection must be prepared before detecting an emergency service request, the mobile user device establishes a WANET connection to selected emergency service stations in step 102. See descriptions infra of FIG. 5a as to a detailed example of selecting emergency service stations for a WANET connection. If the mobile user device determines otherwise, the mobile user device does not set up a WANET connection and waits for an emergency service request.

In establishing a WANET connection, a mobile user device may connect to a single emergency service station which has the strongest signal for the WANET connection, or to multiple emergency service stations. In the single point connection option, a single service station which has the strongest signal for communication maintains connection to the mobile user device. If a WANET connection is required to service an emergency service request, the closest point of reference for the location of the mobile user device requesting an emergency service is the location of the single emergency service station maintaining the WANET connection to the mobile user device. Within the local emergency system, the location of the emergency service station maintaining a WANET connection to the mobile user device is already known to the emergency service provider. With the multiple point connection option, the mobile user device would maintain multiple connections to multiple emergency service stations. Because there are multiple points of reference, the emergency service provider may use interpolation and/or triangulation to locate the mobile user device. The multiple point connection option is advantageous for emergency systems with densely populated emergency service stations because the mobile user device can be more exactly located than the single point connection option. A single emergency service request reported from multiple emergency service stations can be distinguished from multiple emergency service requests by using a unique identifier for the mobile user device attached to an emergency service request. Examples of a unique identifier may be, inter alia, a phone number, Single Inline Memory Module (SIMM) number, etc. The decision on which option should be employed to support a WANET connection depends on the characteristics of a local emergency system, communication capability of a mobile user device, etc. In step 102, the mobile user device establishes a WANET connection to a number of emergency service stations as chosen by the WANET configuration or by a user input through the mobile user device.

If a WANET connection should be prepared before detecting an emergency service request as in step 102, the WANET connection may be established, at the earliest, when a mobile user device moves into the vicinity of an emergency service station. The WANET connection may be established either transparently to the user, or with a simple audio/visual display indicating that a WANET to a certain local emergency system has been established. The timing of establishing a WANET connection is analogous to the connection establishment of a cellular network. Although this option is advantageous in promptly responding to an emergency service request, establishing a WANET connection for every mobile user device in the vicinity of an emergency service station may incur serious overheads because most of mobile user devices establishing a WANET connection would move outside of the WANET connection range without actually broadcasting an emergency service request. As the mobile user device moves around, a new WANET connection from the mobile user device to emergency service stations keeps being established and dropped.

In step 103, the mobile user device detects an emergency service request from a user input. The key combination to input an emergency service request may be, inter alia, a special button on a keypad of a cellular phone, a series of keys in a predefined sequence, etc.

In step 104, the mobile user device broadcasts the detected emergency service request. After broadcasting the emergency service request, the mobile user device determines whether there is a WANET connection for communicating with an emergency service station in step 105, and then establishes a WANET connection in step 106 if there is no WANET connection already established. If a WANET connection has already been established in step 102 supra, the mobile user device proceeds without performing step 106. When a WANET connection is established only when an emergency service request is broadcasted as in steps 105 and 106, overheads establishing a possibly unnecessary WANET connection described in the step 102 supra is significantly reduced when there is no emergency service request. However, when an emergency service request is actually broadcasted, there may be some delay in establishing a WANET connection and responding to the emergency service request.

In step 109, the mobile user device determines whether the mobile user device had received a request for more information about the emergency service request from an emergency service station. The request for more information is received from the emergency service station at M1. If the mobile user device determines that a request for more information has been received, the mobile user device responds to the emergency service station with requested information in step 110. The responded information is delivered to the emergency service station at M2. If the mobile user device determines that a request for more information has not been received, the mobile user device waits for an acknowledgement from the emergency service station which had received and is servicing the broadcasted emergency service request, which indicates that the emergency service request had been reported to the emergency service provider. In step 116, the mobile user device receives the acknowledgement.

Figure 3:
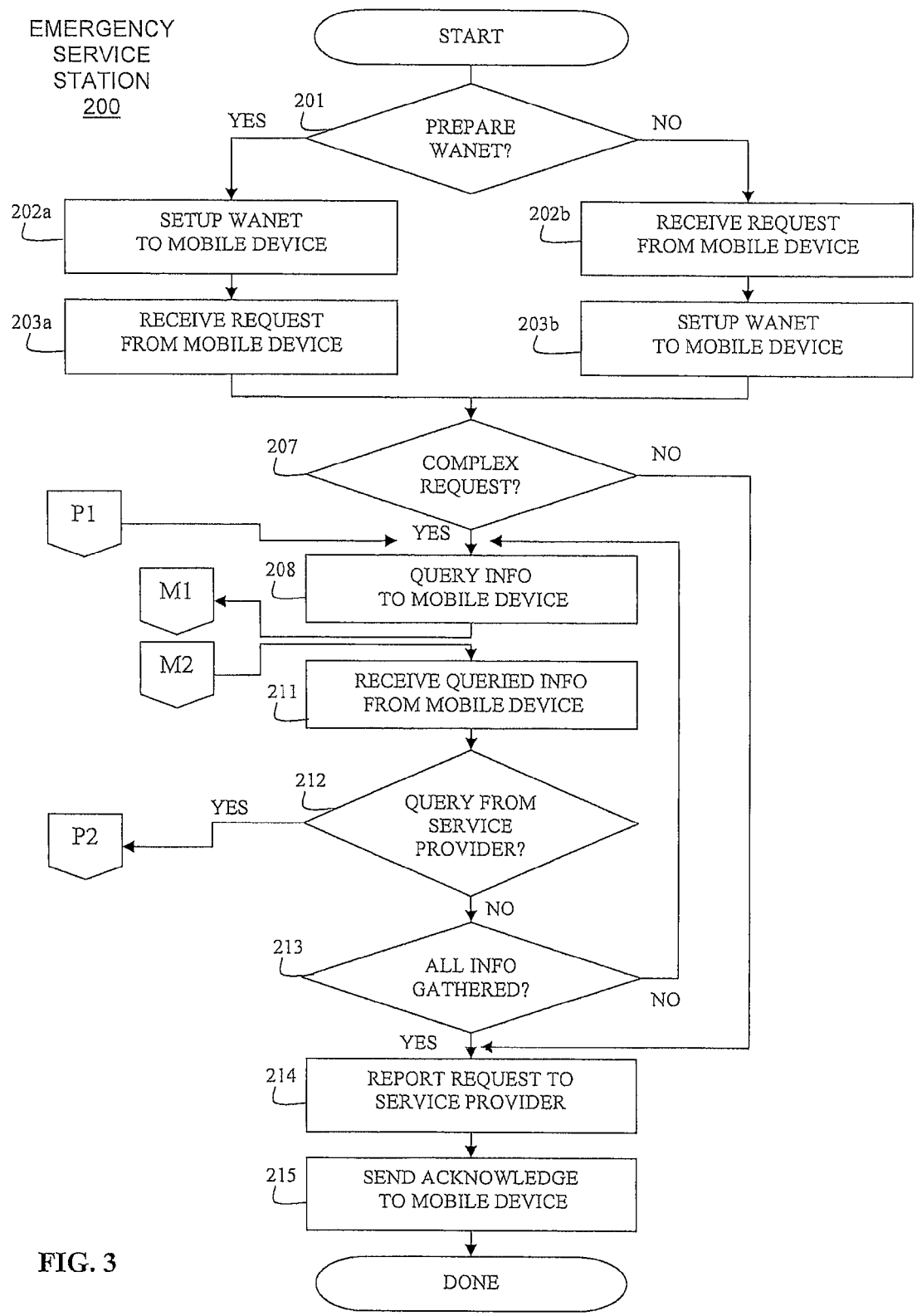
FIG. 3 is a flow chart depicting a method for triggering a local emergency system using wireless means performed by an emergency service station of FIG. 1, in accordance with embodiments of the present invention.

FIG. 3 is a flow chart depicting a method for triggering a local emergency system using wireless means performed by an emergency service station of FIG. 1, in accordance with embodiments of the present invention.

As described supra in FIG. 1, the emergency service station communicates with a mobile user device via a WANET connection, and communicates with an emergency service provider via an emergency system network within the local emergency system.

In step 201, the emergency service station determines whether a WANET connection must be prepared before receiving an emergency service request pursuant to the characteristics of the wireless network and the wireless communication protocol employed for the WANET connection. The determination by the emergency service station in step 201 on the timing of establishing a WANET connection should be consistent with the determination by the mobile user device in step 101 supra. If the emergency service station determines that a WANET connection must be prepared before receiving an emergency service request, the emergency service station establishes a WANET connection to mobile user device in step 202a, waits for an emergency service request, and then receives an emergency service request in step 203a. If the emergency service station determines otherwise, the emergency service station does not set up a WANET connection until the emergency service request is received in step 202b, and then establishes a WANET connection in step 203b. Although multiple WANET connection could be made between single mobile user device and multiple emergency service stations, the wireless communication protocol may be configured to use only a single WANET connection. With single connection option, multiple emergency service stations which had received same emergency service request broadcasted from the mobile user device may negotiate among them about which the emergency service station will establish and maintain a WANET connection.

In step 207, the emergency service station determines whether the type of an emergency service request is simple or complex. If the emergency service request is complex, then more information is necessary to report the emergency service request to the emergency service provider. If the emergency service station determines that the emergency service request is complex, then the emergency service station requests for more information to the mobile user device which had broadcasted the emergency service request via the WANET connection in step 208.

Because the emergency service station relays communication between the emergency service provider and the mobile user device, the emergency service station should query information to the mobile user device when the emergency service station is queried for information by the emergency service provider. The query from the emergency service provider is transmitted to the emergency service station at P1 and the emergency service station proceeds with step 208.

The query is relayed to the mobile user device via the WANET connection at M1. When the mobile user device receives the query and responds with information in step 110 supra, the emergency service station receives the queried information in step 211 at M2.

In step 212, the emergency service station determines whether the emergency service provider requested information. If the emergency service station determines that the emergency service provider requested information, the emergency service station relays the information received from the mobile user device to the emergency service provider at P2 via the emergency system network. If the emergency service station determines otherwise in step 212, then the received information is accounted for the information gathering by the emergency service station to report an emergency service request of a complex type. In step 213, the emergency service station determines whether all information necessary to report the emergency service request is gathered. If the emergency service station determines that all necessary information is gathered, then the emergency service station reports to the emergency service provider in step 214. If the emergency service station determines otherwise, the emergency service station proceeds with more query to the mobile user device in step 208.

Even though the emergency service request is a complex request, there may be occasions that the information gathering in steps 208, 211, 212 and 213 is not successful. The failure in information gathering may be caused by, inter alia, a disconnected WANET connection between the reporting mobile user device and the emergency service station, a non-responsive user, etc. In cases where information gathering is unsuccessful, the emergency service station may bypass the information gathering steps 208, 211, 212 and 213 and proceed to reporting to the emergency service provider in step 214 only with the currently available information as in a simple emergency service request. The emergency service station may include, inter alia, predefined default values for additional information request, and/or the indication of the disconnected WANET connection in reporting the emergency service request to the emergency service provider.

If the emergency service station determines that the emergency service request is of a simple type in step 207, the emergency service station already has enough information to report the emergency service request to the emergency service provider. Thus, the emergency service station reports the emergency service request to the emergency service provider in step 214 via the emergency system network. After reporting to the emergency service provider, the emergency service station sends an acknowledgement to the mobile user device which had broadcasted the emergency service request in step 215.

Figure 4:
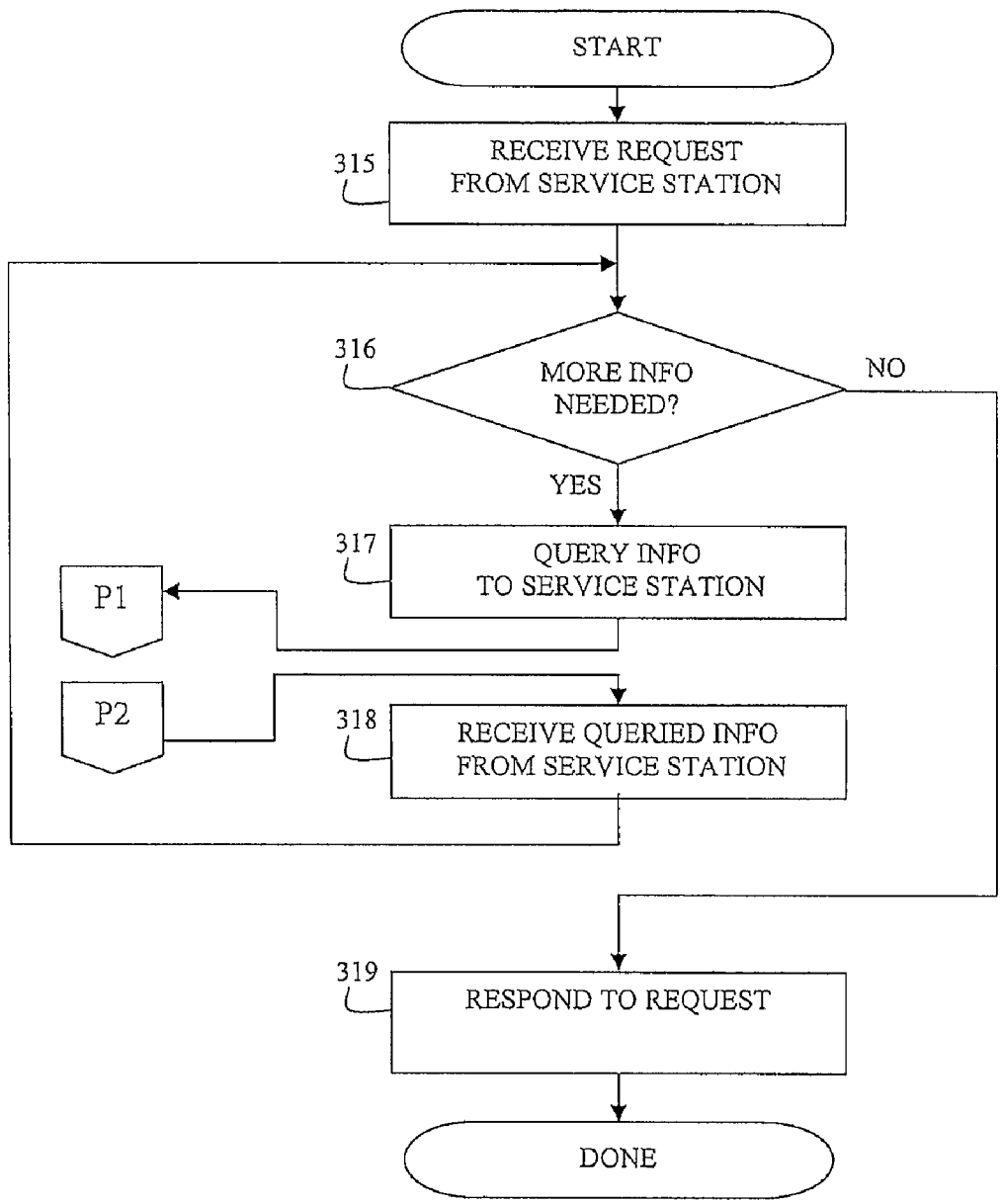
FIG. 4 is a flow chart depicting a method for triggering a local emergency system using wireless means performed by an emergency service provider of FIG. 1, in accordance with embodiments of the present invention.

FIG. 4 is a flow chart depicting a method for triggering a local emergency system using wireless means performed by an emergency service provider of FIG. 1, in accordance with embodiments of the present invention.

In step 315, the emergency service provider receives an emergency service request from an emergency service station. As described in steps 101 and 102 supra of FIG. 2, there might be multiple emergency service stations reporting same emergency service request. In such cases, the emergency service provider interpolates the location of the mobile user device using the location information of the reporting emergency service stations. The number of reporting emergency service stations may vary, and the emergency service provider may use triangulation to locate the mobile user device if there are more than two reporting emergency service stations.

In step 316, the emergency service provider determines whether more information is necessary to respond to the emergency service request. If the emergency service provider determines that more information is necessary, then, in step 317, the emergency service provider requests more information to the emergency service station which has reported the emergency service request. The request for more information to the emergency service station is transmitted via the emergency system network at P1. When the emergency service station responds with the requested information at P2, then in step 318 the emergency service provider receives the information from the emergency service station. Note that even though the request for more information is responded by the mobile user device via the WANET connection, the information is relayed to the emergency service provider by the emergency service station through the emergency system network. After receiving the requested information in step 318, the method loops back to step 316, wherein the emergency service provider determines whether more information is necessary to respond to the emergency service request.

If the emergency service provider determines that no more information is necessary, the emergency service provider responds to the emergency service request in step 319.

Figure 5A:
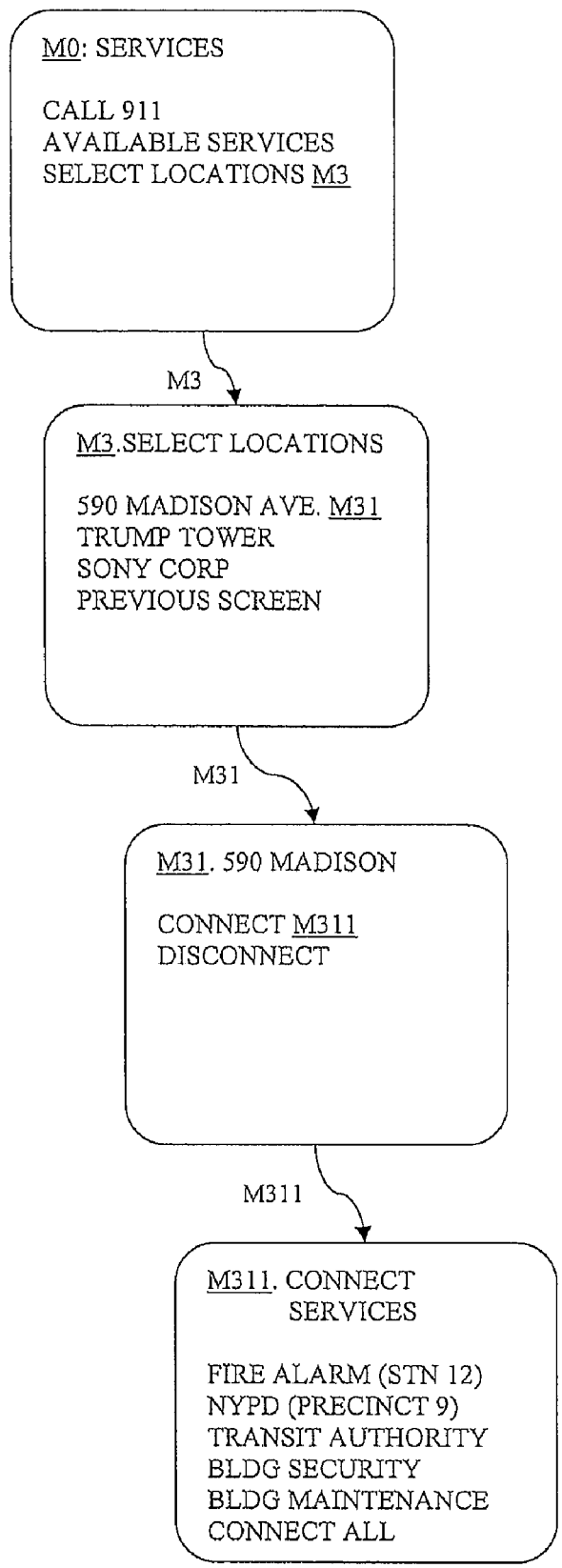
FIG. 5a depicts a first example with a menu screen hierarchy for a mobile user device implementing the method of the present invention, in accordance with embodiments of the present invention.

FIG. 5a depicts a first example with a menu screen hierarchy for a mobile user device implementing the method of the present invention, in accordance with embodiments of the present invention.

The present invention facilitates a user to select an emergency service station with which a mobile user device establishes a WANET connection before an emergency service request is detected from a user input. The steps of determining whether to prepare a WANET connection, selecting the emergency service station for the WANET connection and establishing the WANET connection to the selected emergency service station are performed by the mobile user device in steps 101 and 102, respectively, supra of FIG. 2.

The mobile user device displays M0 SERVICES screen when a user triggers an option for emergency services. If the user chooses SELECT LOCATIONS M3 item in M0 SERVICES screen, the mobile user device broadcasts a request for a response throughout the geographical range available for a WANET connection. Any emergency service station which receives the broadcasted request responds to the mobile user device. As shown in M3 screen, multiple emergency service stations from various local emergency service systems may respond. The mobile user device displays location information of responding emergency service stations in M3 SELECT LOCATIONS screen. If the user selects 590 MADISON AVE. M31 item in M3 SELECT LOCATIONS screen, the mobile user device displays available options for the selected emergency service station at the location. If the user selects CONNECT M311 item in M31 590 MADISON AVE. screen, the mobile user device displays available emergency services provided by the selected emergency service station located at 590 Madison Avenue.

Figure 5B:
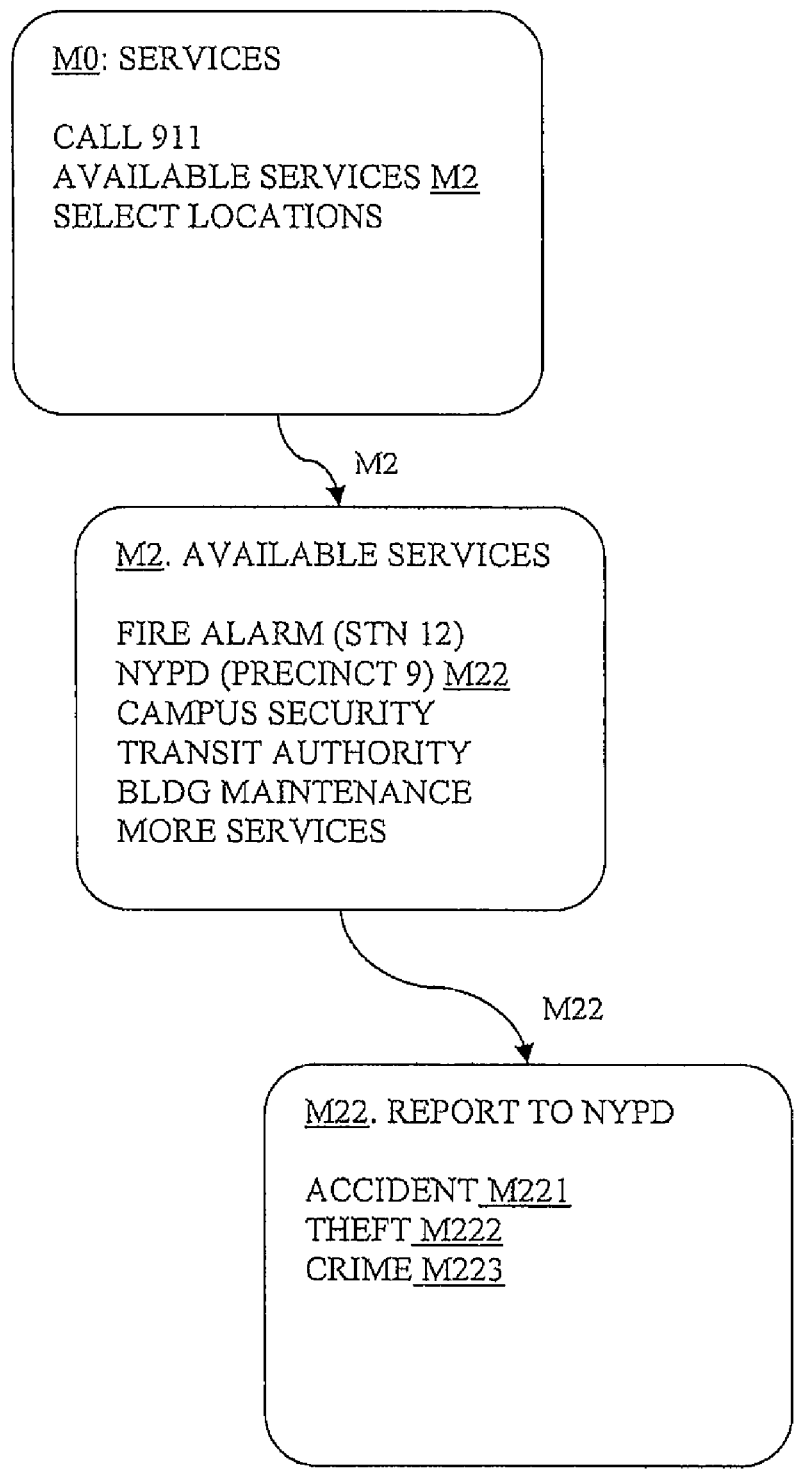
FIG. 5b depicts a second example with a menu screen hierarchy for a mobile user device implementing the method of the present invention, in accordance with embodiments of the present invention.

FIG. 5b depicts a second example with a menu screen hierarchy for a mobile user device implementing the method of the present invention, in accordance with embodiments of the present invention.

The present invention facilitates a user of a mobile user device to collect additional information from an emergency service station about a local emergency system and about an emergency service provided by the local emergency system. The mobile user device communicates with the emergency service station via a WANET connection. The steps of determining whether a request for more information was received and responding to the request for more information are performed by the mobile user device in steps 109 and 110, respectively, supra of FIG. 2. The steps of determining whether more information is necessary, requesting more information to the mobile user device, receiving the requested information from the mobile user device, determining whether the received information is for the emergency service provider or the emergency service station, and determining that all necessary information has been gathered for the emergency service station to report the emergency service request or for the emergency service provider to respond to the emergency service request are performed by the emergency service station in steps 207, 208, 211, 212, and 213, respectively, supra of FIG. 3.

The mobile user device displays the M0 SERVICES screen when a user triggers an option for emergency services. If the user chooses AVAILABLE SERVICE M2 item in M0 SERVICES screen, the mobile user device broadcasts a request for a response throughout the area and receives a response from an emergency service station. The mobile user device displays the responding emergency service stations in M2 screen. If the user chooses NYPD (PRECINCT 9) M22 item in M2 AVAILABLE SERVICE screen, the mobile user device displays M22 REPORT TO NYPD screen with available emergency services for the NYPD emergency system at the location. The user may report an accident, a theft, or a crime to the NYPD Precinct 9 from the M22 REPORT TO NYPD screen by selecting an item M221, M222, or M223, respectively.

Figure 6:
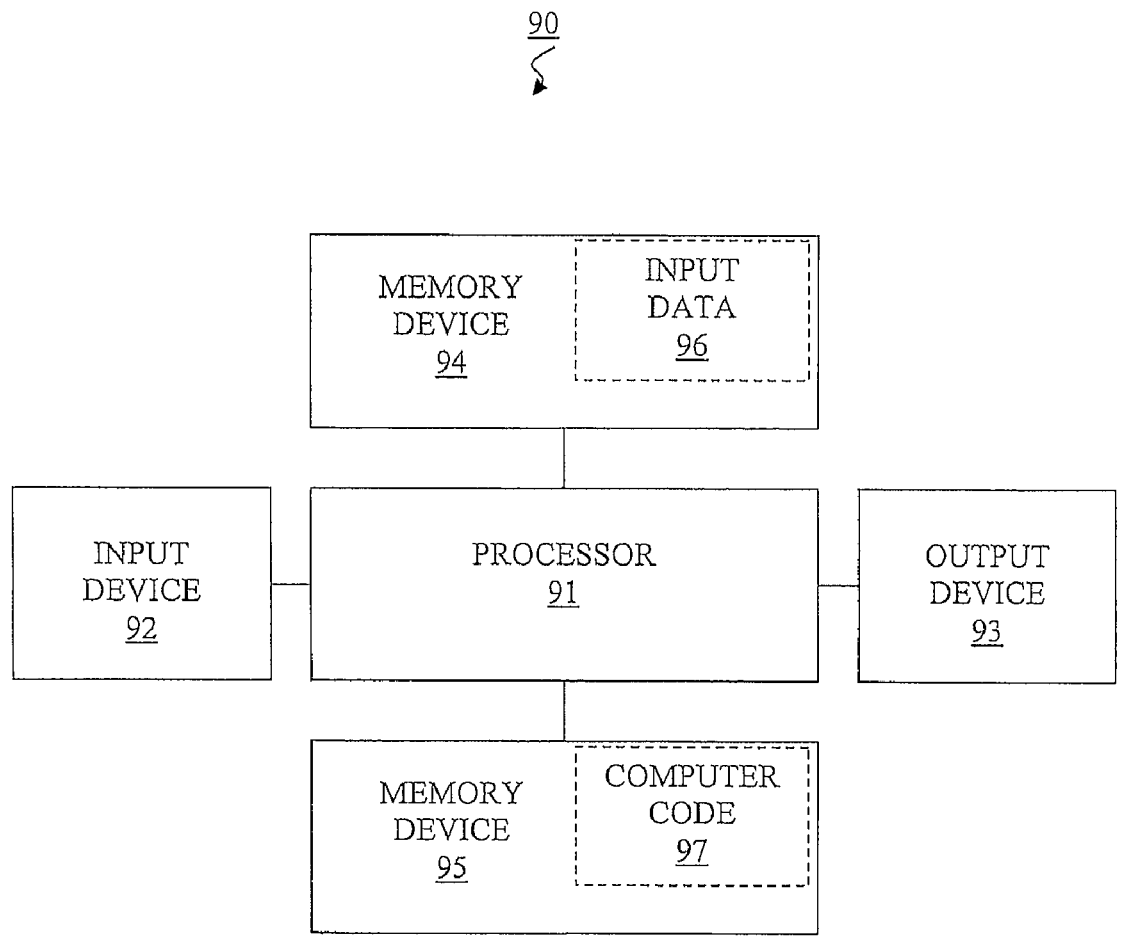
FIG. 6 illustrates a computer system used for triggering a local emergency system using wireless means by a mobile user device, an emergency service station, and an emergency service provider, in accordance with embodiments of the present invention.

FIG. 6 illustrates a computer system 90 used by a mobile user device, an emergency service station, and an emergency service provider for triggering a local emergency system using wireless means, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used by a mobile user device for triggering a local emergency system, an algorithm used by an emergency service station for servicing an emergency service request, an algorithm used by an emergency service provider for servicing an emergency service request, a wireless communication protocol, and/or an emergency system protocol according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for triggering a local emergency system using wireless means according to the present invention.

Any of the components of the present invention could be created, integrated, hosted, maintained, deployed, managed, serviced, supported, etc. by a service provider who offers to facilitate triggering a local emergency system using wireless means. Thus the present invention discloses a process for deploying or integrating computing infrastructure, comprising integrating computer-readable code into the computer system 90, wherein the code in combination with the computer system 90 is capable of performing a method for triggering a local emergency system using wireless means.

In another embodiment, the invention provides a business method that performs the process steps of the invention on a subscription, advertising, and/or fee basis. That is, a service provider, such as a Solution Integrator, could offer to facilitate triggering a local emergency system using wireless means. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for triggering a local emergency system using wireless means, said method comprising:
   detecting, by a mobile user device, an emergency service request from a user input on the mobile user device for an emergency service to the local emergency system, wherein the local emergency system comprises at least one emergency service station, an emergency service provider, and an emergency system network, wherein each emergency service station of said at least one emergency service station is configured to activate the local emergency system from a respective fixed location over a coverage area within which the emergency service is provided by the local emergency system, wherein the emergency service provider provides the emergency service upon being activated by said at least one emergency service station, wherein the emergency system network physically connects said each emergency service station to the emergency service provider, wherein said at least one emergency service station is configured as a wireless access point of the mobile user device to the local emergency system to enable the mobile user device to remotely access the local emergency system and is configured to relay the emergency service request from the mobile user device to the emergency service provider such that the mobile user device remotely activates the local emergency system from locations within the coverage area other than the respective location of said at least one emergency service station, and wherein the emergency service request comprises an identifier that uniquely identifies the mobile user device originating the emergency service request;
   broadcasting, by the mobile user device, the detected emergency service request to the coverage area such that said at least one emergency service station of the local emergency system receives the broadcasted emergency service request; and
   receiving, by the mobile user device, an acknowledgement from an emergency service station of said at least one emergency service station through a wireless ad-hoc connection, wherein the local emergency system had received the broadcasted emergency service request from the mobile user device and is servicing the received emergency service request, wherein the acknowledgement indicates that the broadcasted emergency service request had been reported to the emergency service provider of the local emergency system, and wherein the wireless ad-hoc connection enables bidirectional communication between the emergency service station and the mobile user device for additional exchange of information.

2. The method of claim 1, wherein said method further comprises:
   prior to said receiving the acknowledgement, establishing, by the mobile user device, the wireless ad-hoc connection between the mobile user device and the emergency service station;
   receiving, by the mobile user device, a request for more information from the emergency service station, wherein the request is sent subsequent to a determination by the emergency service station that the emergency service request is of complex type, which requires said more information prior to reporting to the emergency service provider; and
   providing, by the mobile user device, said more information to the emergency service station.

3. A computer program product, comprising a non-transitory program storage device having a computer readable program code embodied therein, said computer readable program code containing instructions that when executed by a processor of a computer system implement the method of claim 1.

4. A computer system comprising a processor and a computer readable memory unit coupled to the processor, said memory unit containing instructions that when executed by the processor implement the method of claim 1.

5. A process for supporting computer infrastructure, said process comprising providing at least one support service for at least one of creating, integrating, hosting, maintaining, and deploying a computer-readable code in a computing system, wherein the code in combination with the computing system is capable of performing the method of claim 1.

6. A method for triggering a local emergency system using wireless means, said method comprising:

receiving, by an emergency service station of at least one emergency service station of the local emergency system, an emergency service request for an emergency service provided by the local emergency system, wherein the emergency service request had been broadcasted by a mobile user device within a coverage area, wherein the local emergency system comprises said at least one emergency service station, an emergency service provider, and an emergency system network, wherein each emergency service station of said at least one emergency service station is configured to activate the local emergency system from a respective fixed location over the coverage area within which the emergency service is provided by the local emergency system, wherein the emergency service provider provides the emergency service upon being activated by said at least one emergency service station, wherein the emergency system network physically connects said each emergency service station to the emergency service provider, wherein said at least one emergency service station is configured as a wireless access point of the mobile user device to the local emergency system to enable the mobile user device to remotely access the local emergency system and is configured to relay the emergency service request from the mobile user device to the emergency service provider such that the mobile user device remotely activates the local emergency system from locations within the coverage area other than the respective location of said at least one emergency service station, and wherein the emergency service request comprises an identifier that uniquely identifies the mobile user device originating the emergency service request;

reporting, by the emergency service station, the received emergency service request to the emergency service provider via the emergency system network with all information necessary to report the received emergency service request to the emergency service provider; and sending, by the emergency service station, an acknowledgement to the mobile user device which had sent the emergency service request through a wireless ad-hoc connection, wherein the acknowledgement indicates that the received emergency service request had been reported to the emergency service provider of the local emergency system, and wherein the wireless ad-hoc connection enables bidirectional communication between the emergency service station and the mobile user device for additional exchange of information.

7. The method of claim 6, wherein said method further comprises:

prior to said receiving, negotiating by the emergency service station with a second emergency service station of a second local emergency system on which emergency service station establishes and maintains the wireless ad-hoc connection to the mobile user device, wherein both the emergency service station and the second emergency service station had received the emergency service request from the mobile user device;

determining that the emergency service station holds the wireless ad-hoc connection with the mobile user device, wherein the emergency service is associated with the local emergency system but not associated with the second local emergency system; and establishing the wireless ad-hoc connection between the mobile user device and the emergency service station.

8. The method of claim 6, wherein said method further comprises:

establishing, by the emergency service station, the wireless ad-hoc connection between the mobile user device and the emergency service station;

determining, by the emergency service station, that the received emergency service request does not have said all information necessary to report the received emergency service request to the emergency service provider;

requesting, by the emergency service station, via the wireless ad-hoc connection, more information, before said reporting, to the mobile user device which had broadcasted the received emergency service request until said all information necessary to report the received emergency service request is requested; and collecting, by the emergency service station via the wireless ad-hoc connection, said more information from the mobile user device following said requesting until said all information is gathered.

9. A computer program product, comprising a non-transitory program storage device having a computer readable program code embodied therein, said computer readable program code containing instructions that when executed by a processor of a computer system implement the method of claim 6.

10. A computer system comprising a processor and a computer readable memory unit coupled to the processor, said memory unit containing instructions that when executed by the processor implement the method of claim 6.

11. A process for supporting computer infrastructure, said process comprising providing at least one support service for at least one of creating, integrating, hosting, maintaining, and deploying computer-readable code in a computing system, wherein the code in combination with the computing system is capable of performing the method of claim 6.

12. A method for triggering a local emergency system using wireless means said method comprising:

receiving, by the emergency service provider of the local emergency system, an emergency service request reported by an emergency service station of at least two emergency service station of the local emergency system through an emergency system network of the local emergency system which had received the emergency service request broadcasted from a mobile user device within a coverage area, wherein the local emergency system comprises said at least two emergency service station, the emergency service provider, and the emergency system network, wherein each emergency service station of said at least two emergency service station is configured to activate the local emergency system from a respective fixed location over the coverage area within which the emergency service is provided by the local emergency system, wherein the emergency service provider provides the emergency service upon being activated by said at least two emergency service station, wherein the emergency system network physically connects said each emergency service station to the emergency service provider, wherein said at least two emergency service station is configured as a wireless access point of the mobile user device to the local emergency system to enable the mobile user device to remotely access the local emergency system and is configured to relay the emergency service request from the mobile user device to the emergency service provider, wherein the emergency service provider provides an emergency service requested by the emergency service request such that the mobile user device remotely activates the local emergency system from locations within the coverage area other than the respective location of said at least two emergency service station, and wherein the emergency service request comprises an identifier that uniquely identifies the mobile user device originating the emergency service request; and responding, by the emergency service provider, to the received emergency service request by providing the emergency service requested by the emergency service request that is associated with the local emergency system.

13. The method of claim 12, wherein said method further comprises:
prior to said responding, determining, by the emergency service provider, a location of the mobile user device as a result of interpolating at least two reports of the emergency service request from a respective emergency service station of said at least two emergency service station, wherein both a first emergency service station had reported a first report of said at least two reports and a second emergency service station had reported a second report of said at least two reports.

14. The method of claim 12, wherein said method further comprises:
determining, by the emergency service provider, that the emergency service provider needs more information to provide the emergency service associated with the received emergency service request;
requesting, by the emergency service provider, via the emergency system network, more information from the emergency service station which had reported the received emergency service request before said responding until all information necessary to service the received emergency service request is requested ;and
collecting, by the emergency service provider via the emergency system network, said more information from the emergency service station following said requesting until said all information is gathered.

15. A computer program product, comprising a non-transitory program storage device having a computer readable program code embodied therein, said computer readable program code containing instructions that when executed by a processor of a computer system implement the method of claim 12.

16. A computer system comprising a processor and a computer readable memory unit coupled to the processor, said memory unit containing instructions that when executed by the processor implement the method of claim 12.

17. A process for supporting computer infrastructure, said process comprising providing at least one support service for at least one of creating, integrating, hosting, maintaining, and deploying computer-readable code in a computing system, wherein the code in combination with the computing system is capable of performing the method of claim 12.

* * * * *